(12) United States Patent
Ishii et al.

(10) Patent No.: US 9,262,355 B2
(45) Date of Patent: Feb. 16, 2016

(54) CONTROLLER CONFIGURED TO CONTROL TIMING OF ACCESS REQUEST ACCORDING TO DENSITY OF BURST ACCESS AND ACCESS LOAD

(71) Applicant: Panasonic Corporation, Osaka (JP)

(72) Inventors: Tomoki Ishii, Kyoto (JP); Takao Yamaguchi, Osaka (JP); Atsushi Yoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 157 days.

(21) Appl. No.: 14/027,638

(22) Filed: Sep. 16, 2013

(65) Prior Publication Data

US 2014/0019663 A1    Jan. 16, 2014

Related U.S. Application Data

(63) Continuation of application No. PCT/JP2012/002309, filed on Apr. 3, 2012.

(30) Foreign Application Priority Data

Apr. 13, 2011 (JP) .................. 2011-089243

(51) Int. Cl.
  *G06F 3/00* (2006.01)
  *G06F 5/00* (2006.01)
  (Continued)

(52) U.S. Cl.
  CPC .............. *G06F 13/28* (2013.01); *G06F 13/372* (2013.01)

(58) Field of Classification Search
  CPC ............ G06F 13/1605; G06F 13/1663; G06F 13/364; G06F 13/4004
  USPC ................................ 710/35, 58, 60, 118, 308
  See application file for complete search history.

(56) References Cited

U.S. PATENT DOCUMENTS 4,627,018 A * 12/1986 Trost et al. ..................... 711/149
6,101,136 A *  8/2000 Mochida .............. G11C 7/1018
                                                365/194

(Continued)

FOREIGN PATENT DOCUMENTS

JP       61-230444 A     10/1986
JP       63-280364 A     11/1988

(Continued)

OTHER PUBLICATIONS

International Search Report for corresponding International Application No. PCT/JP2012/002309 mailed Jul. 3, 2012.

(Continued)

*Primary Examiner* — Faisal M Zaman
(74) *Attorney, Agent, or Firm* — Renner, Otto, Boisselle & Sklar, LLP.

(57) ABSTRACT

A controller as an embodiment of the present disclosure controls a timing of transmitting an access request that has been received from an initiator (or its transmission interval). The controller includes: transmitting and receiving circuitry configured to receive an access request related to burst accesses from a first initiator that is connected via a first bus to, and adjacent to, the transmitting and receiving circuitry and configured to transmit the access request to a second bus implemented as a network; and a transmission interval controller configured to control the timing of transmitting the access request that has been received from the first initiator according to density of the burst accesses during a period in which the burst accesses continue and an access load on the second bus.

13 Claims, 8 Drawing Sheets

(51) Int. Cl.
  *G06F 13/362* (2006.01)
  *G06F 13/36* (2006.01)
  *G06F 13/28* (2006.01)
  *G06F 13/372* (2006.01)

(56) References Cited

U.S. PATENT DOCUMENTS

| | | | |
|---|---|---|---|
| 6,681,285 B1* | 1/2004 | Ng | 710/309 |
| 2002/0054635 A1 | 5/2002 | Nagai et al. | |
| 2004/0073730 A1* | 4/2004 | Horii et al. | 710/113 |
| 2004/0198266 A1* | 10/2004 | Lamacraft | H04L 5/06 455/125 |
| 2005/0097281 A1* | 5/2005 | Tanaka | 711/151 |
| 2005/0268037 A1* | 12/2005 | Hama | G06F 11/3452 711/118 |
| 2007/0101031 A1 | 5/2007 | Fujiwara et al. | |
| 2008/0205432 A1 | 8/2008 | Gangwal | |
| 2008/0215782 A1* | 9/2008 | Mochida et al. | 710/117 |
| 2008/0270658 A1* | 10/2008 | Kaneko et al. | 710/117 |
| 2010/0082877 A1* | 4/2010 | Takizawa | 711/5 |
| 2010/0122040 A1* | 5/2010 | Asai et al. | 711/147 |
| 2010/0177589 A1* | 7/2010 | Kinoshita | G11C 7/1027 365/233.11 |
| 2010/0177590 A1* | 7/2010 | Lee | G11C 7/1027 365/233.18 |
| 2011/0153892 A1* | 6/2011 | Shindo et al. | 710/113 |
| 2012/0250378 A1* | 10/2012 | Kok | H02M 3/156 363/78 |
| 2014/0025855 A1* | 1/2014 | Fujita et al. | 710/118 |

FOREIGN PATENT DOCUMENTS

| | | |
|---|---|---|
| JP | 05-073483 A | 3/1993 |
| JP | 2007-122483 A | 5/2007 |

OTHER PUBLICATIONS

Form PCT/ISA/237 for corresponding International Application No. PCT/JP2012/002309 dated Jul. 3, 2012 and partial English translation.

IEEE Std. 802.3 (Section 4.2.3.2.5) Dec. 2008.

* cited by examiner

| BURST INTERVAL: Tb |
| --- |
| PACKET TRANSFER CYCLES: Tp |
| NUMBER OF TIMES OF ACCESSES: Np |
| STARTING CYCLE: Sb |
| NUMBER OF REMAINING ACCESSES: Rp |
| NUMBER OF REMAINING CYCLES: Rc |
| TRANSMISSION INTERVAL: G |
| LATENCY: L |

CONTROLLER CONFIGURED TO CONTROL TIMING OF ACCESS REQUEST ACCORDING TO DENSITY OF BURST ACCESS AND ACCESS LOAD

This is a continuation of International Application No. PCT/JP2012/002309, with an international filing date of Apr. 3, 2012, which claims priority of Japanese Patent Application No. 2011-089243, filed on Apr. 13, 2011, the contents of which are hereby incorporated by reference.

TECHNICAL FIELD

The present application relates to an apparatus, method and program for controlling a communications bus which is implemented as a network on a semiconductor chip.

DESCRIPTION OF THE RELATED ART

Recently, a network-on-chip (which will be referred to herein as "NoC") has been used more and more often as a communications bus in the fields of system on chip (which will be referred to herein as "SoC") and multi-core processors.

Figure 1:
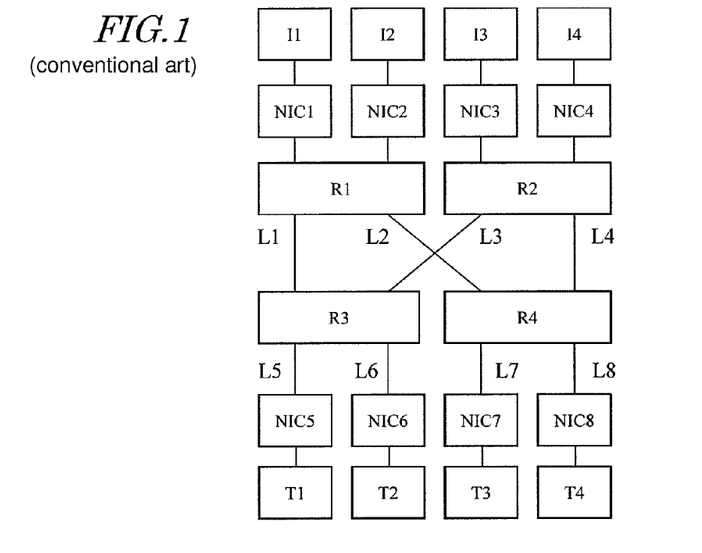
FIG. 1 illustrates an ordinary connection architecture in which an NoC is used as a main bus between initiators I1 through I4 and targets T1 through T4.

FIG. 1 illustrates an ordinary connection architecture in which an NoC is used as a main bus between initiators I1 through I4 and targets T1 through T4. The initiators may be a DSP (digital signal processor), a CPU (central processing unit) or a DMAC (direct memory access controller), for example. The targets may be a memory controller to be connected to an external DRAM, an SRAM or a buffer memory as an input/output buffer interfacing with an external device, for example.

These initiators and targets are connected together so as to communicate with each other through a network bus, which is formed by NoC routers R1 through R4, and via network interface controllers NIC1 through NIC8. In an NoC, every data on the bus is exchanged on a packet basis. That is why the NICs have the ability to packetize and de-packetize transaction data transmitted and received from/at those initiators and targets. Also, the NoC is configured so that links L1 through L8 that connect those routers together are used in common when packets are transmitted from the initiators I1 through I4 to the targets T1 through T4.

In an NoC with a configuration such as the one shown in FIG. 1, the communications band of each link is designed under the two contradictory constraints: one of the two is that the transmission quality required by each initiator in terms of latency and throughput should be ensured by expanding the link's bandwidth; and the other is that an RF design of the circuit should be avoided and power dissipation should be cut down by narrowing the link's bandwidth.

The band required by each initiator generally varies with time. That is why the average bandwidth required per unit time does not agree with the maximum bandwidth. If a plurality of initiators which transmit packets asynchronously by sharing the same link in common attempted to access the same target almost simultaneously using the maximum bandwidth, then the link on the route could not accommodate every one of the accesses, thus causing an increase in latency and a decrease in throughput. Particularly if there were an initiator that attempts to do a burst of accesses, then overload would be imposed on the link on the transmission route during the series of accesses (i.e., the burst accesses), which would debase the communications quality of other initiators that share the same link and obstruct the real-time processing.

Figure 2:
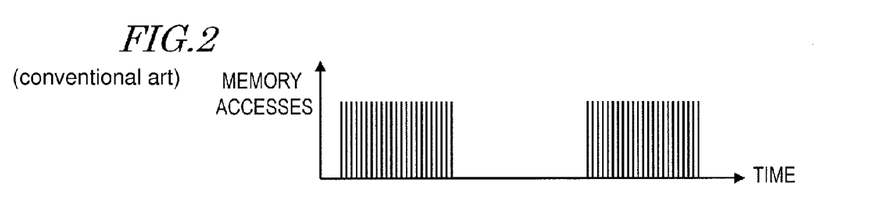
FIG. 2 illustrates an example of burst accesses to a memory.

In this description, the "burst of accesses" or "burst accesses" refers herein to a series of accesses to be done continuously a certain number of times, interrupted with internal computational processing, and then done continuously the same number of times. FIG. 2 illustrates an example of such burst accesses to a memory. In FIG. 2, the abscissa represents the time and the ordinate represents the size of the data that has been retrieved from the memory (i.e., the quantity of memory accesses). As can be seen from FIG. 2, a series of accesses that lasts for a certain period of time arises first, the accesses once stop for a while, and then another series of accesses that lasts for the same period of time arises once again.

Japanese Laid-Open Patent Publication No. 61-230444, hereinafter referred to as "Patent Document No. 1", discloses a technique for avoiding contention between a plurality of initiators, which operate asynchronously and which share the same communications bus in common, over packet transmission. Specifically, each of those initiators monitors the communications bus to sense any contention over transmission, sets a standby time at random by itself and waits until the standby time passes, and then resumes its transmission operation. By performing such an operation, the respective initiators can share the same communications bus in common while avoiding contention over packet transmission autonomically.

Meanwhile, IEEE Std 802.3 (Section 4.2.3.2.5), hereinafter referred to as "Non-Patent Document No. 1", discloses how to calculate the standby time. According to Non-Patent Document No. 1, by setting the length of the standby time according to the length of the period for which contention with the other initiators has been sensed to last, contention over transmission request can be avoided efficiently.

SUMMARY OF THE INVENTION

Non-Patent Document No. 1 relates to transmission protocol technologies for a general network, which are difficult to apply to every NoC across the board. The reason is that general network communications are usually best effort communications that permit some delay but communications through NoC often require real time processing that does not permit delay.

That is why there is an increasing demand for a technique for getting the processing done in as close to real time as possible while burst accesses arise in an NoC, for example.

A non-limiting exemplary embodiment of the present application provides a controller that controls a timing of transmitting an access request that has been received from an initiator. The controller includes: transmitting and receiving circuitry configured to receive an access request related to burst accesses from a first initiator that is connected via a first bus to, and adjacent to, the transmitting and receiving circuitry and configured to transmit the access request to a second bus implemented as a network; and a transmission interval controller configured to control the timing of transmitting the access request that has been received from the first initiator according to density of the burst accesses during a period in which the burst accesses continue and an access load on the second bus.

According to an aspect of the present invention, while burst accesses arise in an NoC, for example, the processing can get done in as close to real time as possible, and the band can be used as efficiently as possible.

This general and particular aspect can be implemented as a system, a method, a computer program or a combination thereof.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

As described above, general network communications are usually best effort communications that permit some delay, but communications through NoC often require real time processing that does not permit any delay. Things should be done in that way as far as an NoC is concerned. Hereinafter, it will be described more specifically why.

A DSP that processes a video or audio signal operates in a data processing period, which is obtained by dividing one period of a video frame or an audio frame. That is why a DSP often tends to transmit a plurality of packets asynchronously at the top of a data processing period. All of those packets that have been transmitted should be processed by the same deadline because every one of those packets should be processed within the same period. However, if a number of such packets have been transmitted onto the bus at almost the same, then contention will arise for the same resource, a heavier load will be imposed on the bus, and those packets cannot be processed by the deadline. Burst accesses to a memory represent a typical situation where a number of packets are transmitted continuously and asynchronously.

However, it is difficult to overcome the problem by applying the conventional technology described above. According to the conventional technology, if contention arises a number of times, then the standby time is extended at random with its upper limit raised every time. As a result, not every access can be done within one period, the real time processing cannot be accomplished, and some part of the signal processing remains unfinished.

Figure 3:
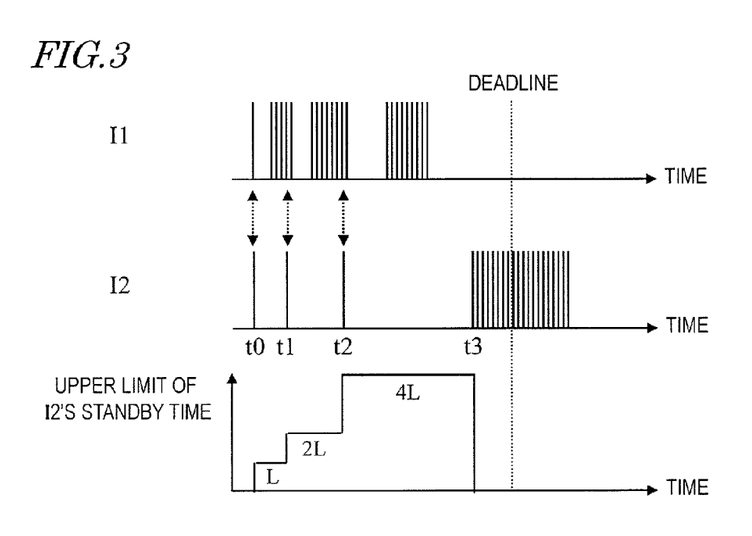
FIG. 3 illustrates a situation where not every access can be done by the deadline by applying the conventional technology.

FIG. 3 illustrates a situation where not every access can be done by the deadline by applying the conventional technology. Both of the initiators I1 and I2 shown in FIG. 3 are supposed to make burst accesses. In a situation where contention arises between multiple initiators that make burst accesses, every time the contention arises, the upper limit of the standby time is raised as shown in FIG. 3. Suppose both of the initiators I1 and I2 start sending access requests at the same time t0. That is to say, the access contention arises for the first time at the time t0. In that case, each of the initiators I1 and I2 sets a standby time with an upper limit L at random by itself, thereby avoiding contention. If the standby time set by the initiator I1 is shorter than the one set by the initiator I2, then the initiator I1 resumes making burst accesses earlier than the initiator I2 When the standby state of the initiator I2 is removed at a time ti, contention arises again. In this case, as the initiator I2 has sensed contention twice in a row, the upper limit of the standby time is doubled. As a result, the upper limit of the initiator I1 becomes shorter than that of the initiator I2 again. And when the standby state of the initiator I2 is removed at a time t2, contention with the initiator I1 that has resumed making accesses earlier arises again. In this case, as the initiator I2 has sensed contention three times in a row, the upper limit of the standby time is raised fourfold.

In this manner, the initiator I2 which has waited a long time since the contention arose for the first time will also be at a disadvantage when contention arises for the second time and for the third time, and it is not until a time t3 that the initiator I2 can resume making accesses again. By the time t3, the initiator I1 has done all of its accesses. That is why the initiator I2 can resume making burst accesses at the time t3. However, since the standby time has been extended over and over again, there is no longer enough time left to get every access done by the deadline shown in FIG. 3. As a result, according to the conventional technology, the predetermined number of accesses cannot be done within one data processing period, and therefore, real-time processing cannot be accomplished.

Thus, the present disclosure provides a technique for minimizing contention appropriately and getting the processing done in as close to real time as possible even in such a situation where multiple initiators or nodes that are all attempting to make burst accesses are contending with each other.

A controller according to an aspect of the present invention controls a timing of transmitting an access request that has been received from an initiator. The controller includes: transmitting and receiving circuitry configured to receive an access request related to burst accesses from a first initiator that is connected via a first bus to, and adjacent to, the transmitting and receiving circuitry and configured to transmit the access request to a second bus implemented as a network; and a transmission interval controller configured to control the timing of transmitting the access request that has been received from the first initiator according to density of the burst accesses during a period in which the burst accesses continue and an access load on the second bus.

The transmission interval controller may calculate the density of the burst accesses based on how many times the access requests have been received from the first initiator during the period in which the burst accesses continue.

A second initiator may be connected to the second bus, and the transmission interval controller may obtain, as the access load on the second bus, a latency that is the amount of time that it takes to get a response since the access request was transmitted to the second initiator.

If the value of a permissible delay, which is the maximum amount of delay permitted by an access request from the first initiator, is not negative, the transmission interval controller may obtain the latency and may control the timing of transmitting the access request that has been received from the first initiator.

The transmission interval controller may calculate the value of the permissible delay based on a predetermined cycle, the number of remaining cycles, and the number of unprocessed access requests.

The transmission interval controller may obtain the latency between the first initiator and the second initiator that is connected to the second bus, and if the latency is greater than at least one predetermined threshold value, may extend the transmission interval so as to delay the timing of transmitting the access request that has been received from the first initiator.

The transmission interval controller may calculate a second transmission interval by adding a value associated with the density of the burst accesses to a first transmission interval currently set, and if the second transmission interval is smaller than the value of the permissible delay, may control the timing of transmitting the access request that has been received from the first initiator based on the second transmission interval.

The transmission interval controller may obtain the latency between the first initiator and the second initiator that is connected to the second bus, and if the latency is equal to or smaller than at least one predetermined threshold value, may shorten the transmission interval so as to accelerate the timing of transmitting the access request that has been received from the first initiator.

The transmission interval controller may calculate a second transmission interval by subtracting a value associated with the density of the burst accesses from a first transmission interval currently set, and if the second transmission interval is smaller than the value of the permissible delay, may control the timing of transmitting the access request that has been received from the first initiator based on the second transmission interval.

If the second transmission interval is equal to or greater than the value of the permissible delay, the transmission interval controller may control the timing of transmitting the access request that has been received from the first initiator based on the value of the permissible delay.

The transmission interval controller may prohibit the first initiator from issuing access requests for a period of time corresponding to the sum of the second transmission interval and the time it takes to transfer a transaction.

According to an aspect of the present invention, in a communications bus (such as a semiconductor bus) through which a plurality of packets with the same deadline for processing are sent and received asynchronously, the interval at which those packets are transmitted is adjusted appropriately, thereby getting a required number of accesses done in the shortest time without missing that deadline. As a result, the communications band can be used much more efficiently at a low communications bus rate and with low bus power dissipation with any kind of application such as media processing done in as close to real time as possible.

Hereinafter, an embodiment of a transmission interval controller according to an aspect of the present invention will be described with reference to the accompanying drawings. In the following description of embodiments, a transmission interval controller will be described as being applied to a situation where an NoC is used as an SoC main bus to be built in a cellphone or an audiovisual device.

Figure 4:
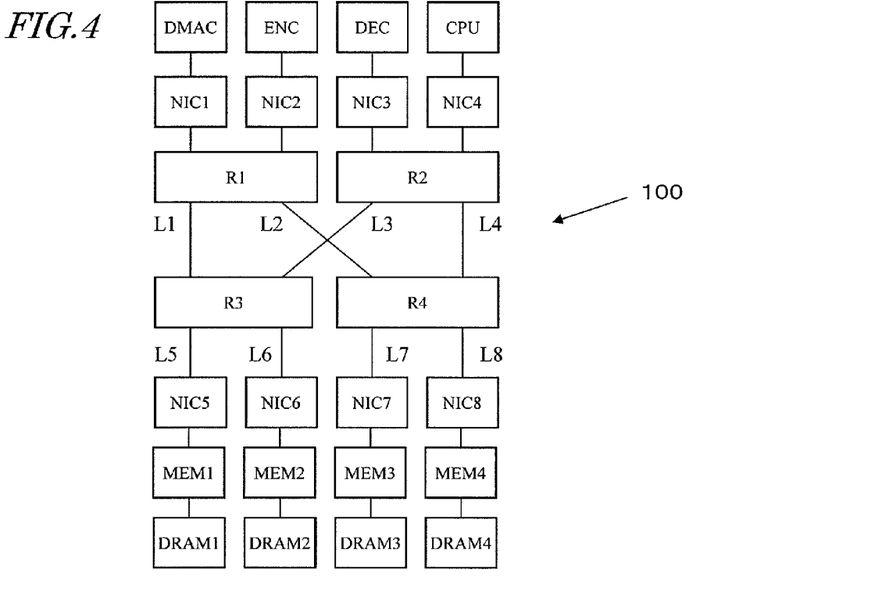
FIG. 4 illustrates an exemplary configuration for an SoC 100 with an NoC bus according to an embodiment of the present invention.

FIG. 4 illustrates an exemplary configuration for an SoC 100 with an NoC bus. This SoC 100 may be built in a cellphone or an audiovisual device. In FIG. 4, data is transmitted from one of the initiators shown at the top to one of the targets shown at the bottom. Or in response to a read request from the initiator, data is transmitted from the target to that initiator.

In FIG. 4, shown are some examples of the bus initiators and targets. Specifically, examples of those initiators include a DMAC (direct memory access controller) which performs display processing on the screen, an ENC (encoder) which performs MPEG (Moving Picture Experts Group) encoding on a video signal, a DEC (decoder) which performs MPEG decoding on a video signal, and a CPU (central processing unit) which performs Web browser or user interface processing. On the other hand, examples of the targets include MEMs (memory controllers) #1 through #4 which are connected to external DRAMs #1 through #4, respectively.

Each of these initiators and targets is connected to a network interface controller NICn (where n is an integer and $1 \leq n \leq 8$). And the network interface controllers are connected together via a router Rk (where k is an integer and $1 \leq k \leq 4$). As a result, the respective initiators and targets are connected together so as to communicate with each other.

A transmission interval controller according to an aspect of the present invention functions as an NICn (where n is an integer and $1 \leq n \leq 4$) which is connected to any of the initiators. The configuration of the NIC functioning as a transmission interval controller will be described in detail later with reference to FIG. 12.

Now, it will be described generally how data is processed basically and where data flows in this SoC 100.

First of all, one of the initiators generates a request transaction as an access request with respect to a target and outputs the request transaction to the NIC that is connected to itself.

On receiving the request transaction from the initiator, the NIC packetizes the request transaction received and transmits the packet to a network bus which is formed by connecting routers Rk (where k is an integer and $1 \leq k \leq 4$) together.

Next, another NIC receives the packet that has been transmitted from the initiator via the router R, and decodes the initiator's request transaction by de-packetizing the packet. Then, the NIC transfers the request transaction thus obtained to the memory controller that is connected to itself. In accordance with the request transaction, the memory controller writes data on the DRAM (i.e., performs a data write operation) or reads data from the DRAM (i.e., performs a data read operation). And the result is passed from the memory controller MEM to the NIC.

In response, the NIC connected to the memory controller MEM packetizes the reply transaction, which has been obtained by making the memory controller MEM read from, or write to, the DRAM, and transmits the packet onto the network bus formed by the routers R.

Then, one of the NIC1 through NIC4 that are connected to the initiators receives and de-packetizes the reply packet from the target, forms a reply transaction, and provides it as an access result for the initiator.

A specific example of the request transaction and the reply transaction will be described. In the example to be described below, the DMAC is supposed to transmit a request transaction 10 requesting that data be read from the MEM1.

Figure 5:
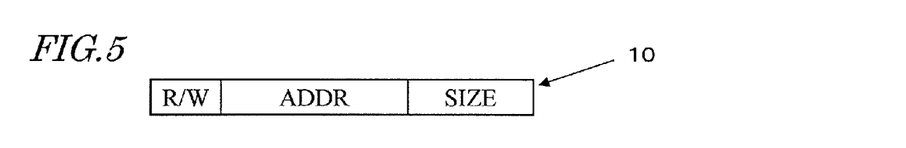
FIG. 5 shows an exemplary data structure for a request transaction 10 that has been generated by DMAC.

FIG. 5 shows an exemplary data structure for the request transaction 10 that has been generated by the DMAC. The request transaction 10 has an R/W field, an ADDR field and a SIZE field, which are identified by R/W, ADDR and SIZE, respectively, in FIG. 5. The same signs will be used in FIGS. 6 to 8, too.

In the R/W field, described is an instruction to perform a read operation on a memory. In the ADDR field, described is a DRAM address from which data needs to be read. And in the SIZE field, specified is the size of the data to be read.

Figure 6:
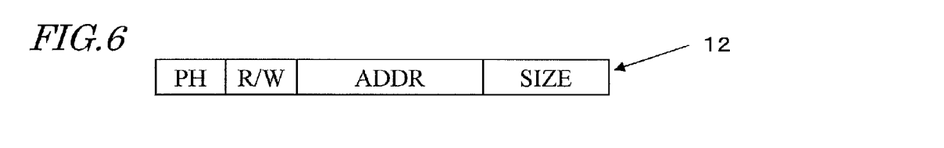
FIG. 6 illustrates a request transaction 12 that has been packetized by NIC1 by adding a packet header PH to the request transaction 10.

FIG. 6 illustrates a request transaction 12 that has been packetized by the NIC1 by adding a packet header PH to the request transaction 10. In the packet header PH, stored is the node ID of the NIC1 that is the source of that request (i.e., the initiator that transmitted the request). Also stored in the packet header PH is the node ID of the NIC5 that is the destination of that request. The NIC5 performs the processing of removing the packet header from the packetized request transaction 12 (i.e., de-packetizing processing), thereby restoring the request transaction 10 shown in FIG. 5 and transferring the request transaction 10 to the MEM1.

By reading the R/W field of the request transaction 10, the MEM1 senses that a read operation needs to be performed. In addition, by reading the ADDR and SIZE fields, the MEM1 retrieves data of the size specified on the SIZE field from the DRAM address specified on the ADDR field. After that, the MEM1 outputs the data thus obtained as a result of reading to the NIC5.

Figures 7, 8:
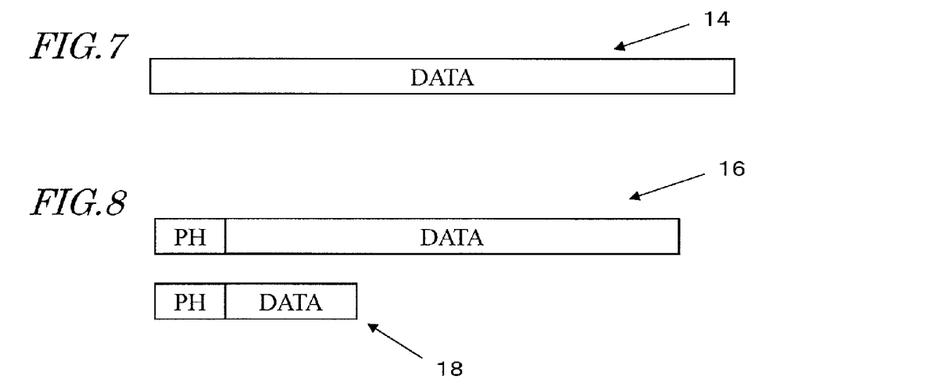
FIG. 7 illustrates an exemplary data structure for a reply transaction 14 that NIC5 has received from MEM1.
FIG. 8 illustrates exemplary data structures for packetized reply transactions 16 and 18.

FIG. 7 illustrates an exemplary data structure for the reply transaction 14 that the NIC5 has received from the MEM1. The NIC5 packetizes the reply transaction and transfers it onto the network bus.

FIG. 8 illustrates exemplary data structures for the packetized reply transactions 16 and 18. The reply transaction 16 is generated by adding a packet header PH to the data that has been obtained. If the data to reply has a large size, then the data may be replied as multiple packets divided. After having received either a single reply packet 16 or multiple reply packets 18, the NIC1 de-packetizes the reply packet 16 or the reply packets 18, thereby restoring the reply transaction 14 shown in FIG. 7. And the NIC1 transfers that data to the DAMC to complete the DMAC's memory access.

Hereinafter, it will be described how the SoC 100 of this embodiment operates.

In the following example, the DMAC as initiator is supposed to perform the processing of displaying video on a screen (not shown). However, suppose a situation where not only the DAMC but also the ENC, DEC and CPU are operating in parallel on the SoC 100 so as to exchange data.

If there were any drop frame or freeze in the video displayed, then the user value of the product would decrease. Thus, to avoid generating such drop frames or freezes, a strict constraint is imposed on the latency during a memory access and it is important to get the display processing done in as close to real time as possible.

Figure 9:
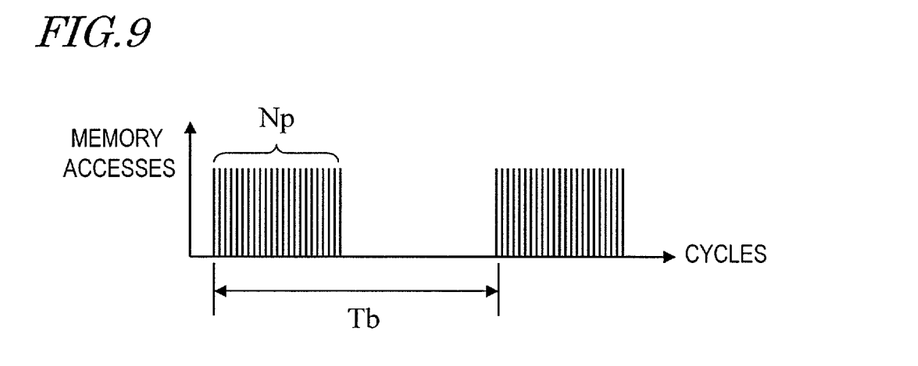
FIG. 9 illustrates typically how burst accesses are carried out.

Meanwhile, the ENC and DEC that perform video and audio encoding and decoding (such as MPEG encoding and decoding) algorithms generate a burst of accesses during their signal processing. FIG. 9 illustrates typically how such burst accesses are carried out. In FIG. 9, Tb denotes one period in which such burst accesses are generated. As for a codec that carries out signal processing on an MPEG macroblock basis, Tb is represented as the number of cycles corresponding to one macroblock period. Np denotes the number of times of accesses generated per burst. Before the burst accesses are started, Np is determined by the codec's processing algorithm.

Also, the CPU is used to perform interaction processing with the user or Internet browsing processing. As for the CPU, it is difficult to predict when and how many times accesses will be generated. However, the real-time processing requirement for the CPU is not so strict as the ones for the other initiators.

The routers that form the network bus determine the output port by reference to the address specified in the packet header and transfer the packets one after another. The number of cycles Tp it takes to transfer a single packet varies according to the internal hardware configuration and the packet size.

Figure 10:
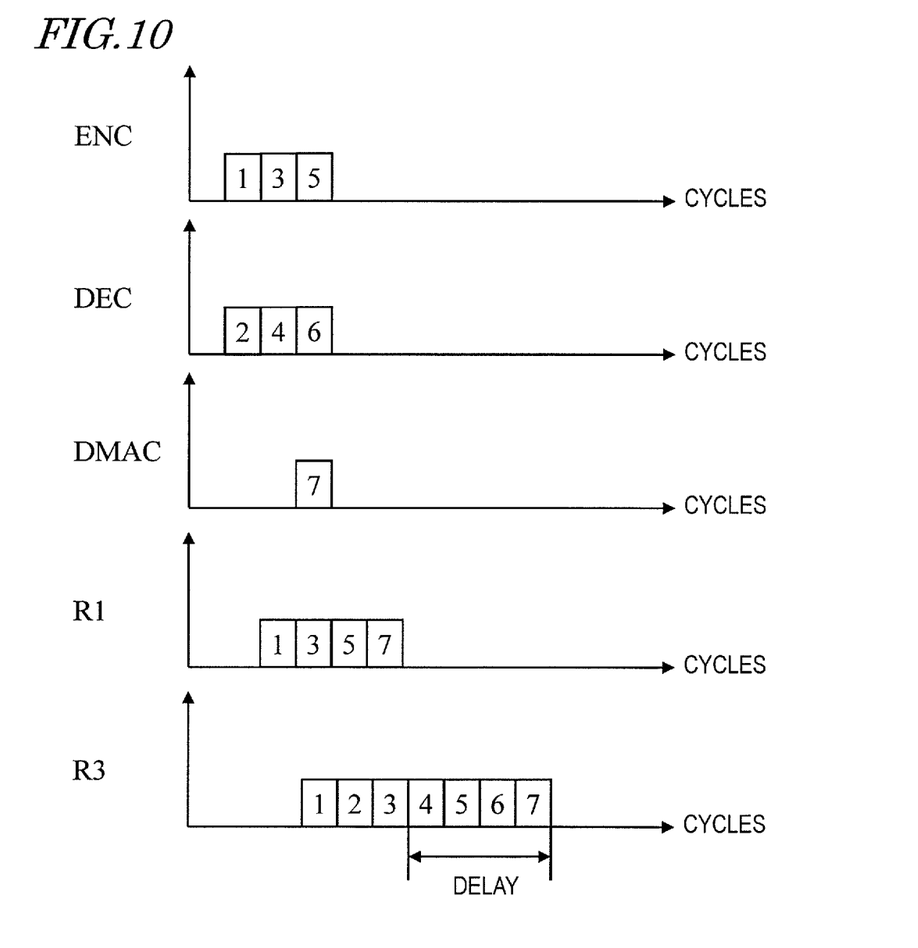
FIG. 10 illustrates how if DMAC, ENC and DEC issue access requests with respect to MEM1 at the same time, the access by the DMAC gets delayed.

FIG. 10 illustrates how if the DMAC, ENC and DEC issue access requests with respect to the MEM1 at the same time, the access by the DMAC gets delayed. As shown in FIG. 10, it can be seen that the ENC, DEC, DMAC, R1 and R3 output packets and exactly when those packets were output (where the times are expressed in cycles). In FIG. 10, the packets are numbered just for the sake of convenience in order to identify them.

In the example illustrated in FIG. 10, the ENC and DEC transmit the data of Packets #1 and #2 at the same time, Packets #3 and #4 in the next cycle, and Packets #5 and #6 in the cycle after the next one. And when Packets #5 and #6 are output, Packet #7 is also output by the DMAC at the same time.

In the following description, unless there is interference with the packets transmitted by the ENC and DEC, it is supposed to take one cycle for the routers R1 and R3 to transfer a single packet. That is to say, Packet #7 that has been output from the DMAC is supposed to arrive at the MEM1 in two cycles.

The packets transmitted by the ENC and DMAC are received in one cycle by the router R1, which relays the packets to the router R3 on the next stage. However, Packet #7 that was transmitted by the DMAC when Packet #5 was transmitted by the ENC cannot pass through the router R1 simultaneously with Packet #5 from the ENC. Thus, Packet #7 is relayed after Packet #5. In this case, a delay of one cycle is caused to Packet #7.

On the other hand, the DEC starts transmitting Packets #2, #4 and #6 sequentially at the same time as the ENC starts transmitting the packets. Packets #2, #4 and #6 are transmitted to the router R3 via the router R2. The router R3 relays these Packets #2, 0 4 and #6 along with the packets that have come from the router R1. And the router R3 alternately outputs the packets that have come from the router R1 and the packets that have come from the DEC.

According to the packet output timings of the router R3 shown in FIG. 10, it can be seen that the arrival of Packet #7, which has been relayed by the router R3, at the MEM1 is delayed for four cycles compared to Packet #3 that arrived at the MEM1 at the shortest delay of just two cycles. This delay is caused by the contention between packets on the router network. That is why if the number of stages of the network bus increases, the delay will further increase, and the memory access latency of the DMAC may finally exceed the permissible one.

Figure 11:
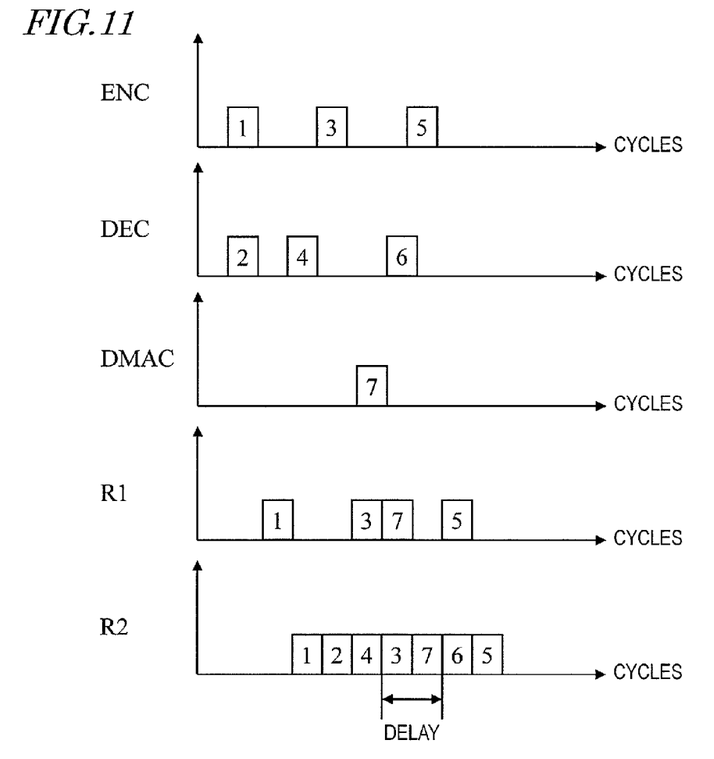
FIG. 11 illustrates how long the access by DMAC will be delayed in a situation where DMAC, ENC and DEC issue access requests with respect to MEM1 while adjusting their transmission interval.

On the other hand, FIG. 11 illustrates how long the access by the DMAC will be delayed in a situation where the DMAC, ENC and DEC issue access requests with respect to the MEM1 while adjusting their transmission interval. As shown in FIG. 11, if the DMAC, ENC and DEC adjust their transmission interval, the latency of the DMAC can be shortened significantly. The ENC and DEC transmit Packets #1 through #6 at longer packet transmission intervals. Meanwhile, the DMAC transmits Packet #7 when no packets are transmitted from the ENC or the DEC. As a result, Packet #7 transmitted by the DMAC arrives at the MEM1 with the shortest latency of two cycles by taking advantage of the cycle in which no packets are transmitted from the ENC or the DEC.

According to this embodiment, the ENC and DEC determine the packet transmission interval dynamically based on the access load state and the degree of advancement of accesses.

Figure 12:
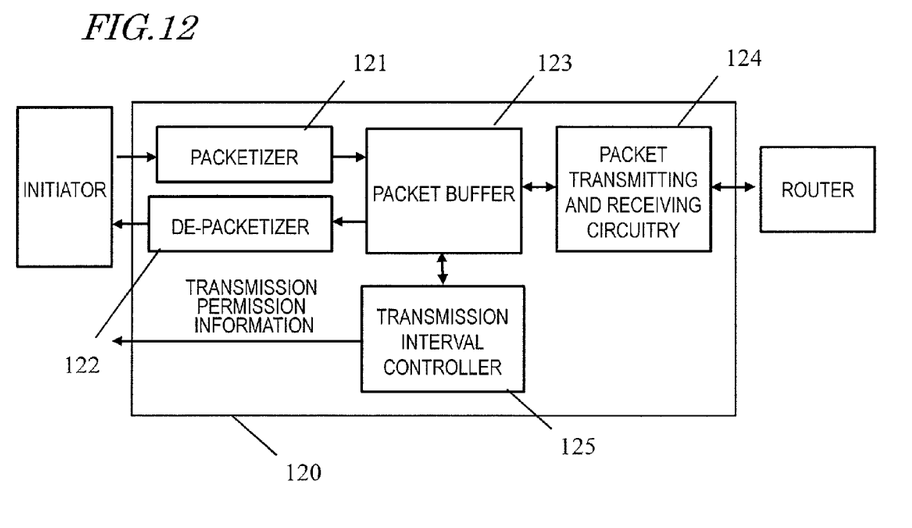
FIG. 12 illustrates a basic configuration for NIC 120 on the initiator end.

FIG. 12 illustrates a basic configuration for the NIC 120 on the initiator end. The NIC 120 may be one of the NIC1 through NIC4 shown in FIG. 4. Considering its function to be described later, the NIC 120 will be sometimes referred to herein as a "transmission interval controller".

The NIC 120 may be either an electronic circuit on the NoC in which the configuration shown in FIG. 1 is implemented or a chip integrated with a predetermined set of chips. Those electronic circuits (i.e., NICs 120) can communicate with each other through a particular physical layer and/or a data link layer.

The NIC 120 includes a packetizer 121, a de-packetizer 122, a packet buffer 123, packet transmitting and receiving circuitry 124 and a transmission interval controller 125.

The packet buffer 123 may be a semiconductor memory such as an SRAM.

On the other hand, the packetizer 121, de-packetizer 122, packet transmitting and receiving circuitry 124 and transmission interval controller 125 are implemented as logic circuits that carry out the functions to be described later. It should be noted that if these components are implemented on the same chip, sometimes they may not be clearly distinguished from each other on the chip.

On receiving data, each of the packetizer 121, de-packetizer 122, packet transmitting and receiving circuitry 124 and transmission interval controller 125 processes the data in one or a few cycles and outputs the processed data in the next cycle.

The packetizer 121 receives the data that has been transmitted from the initiator and adds a packet header to that data, thereby packetizing the data. For example, the packetizer 121 receives the request transaction 10 (see FIG. 5) that has been transmitted from the initiator and adds a packet header PH to the transaction 10, thereby generating packetized request transaction 12 (see FIG. 6). This processing is sometimes called "packetizing processing".

The de-packetizer 122 performs the opposite type of processing from the packetizer 121. That is to say, the de-packetizer 122 removes the packet header from the packet that has been received from the router. This processing is sometimes called "de-packetizing processing".

The packet buffer 123 is a buffer which is provided to temporarily store the packets.

The packet transmitting and receiving circuitry 124 performs processing related to transmission and reception of packets. In transmitting a packet, the packet transmitting and receiving circuitry 124 reads the packet data from the packet buffer 123 on a transmission data bus width basis, thereby performing packet transmission processing. In receiving a packet, on the other hand, the packet transmitting and receiving circuitry 124 stores the received data on the packet buffer 123 on a reception data bus width basis, thereby restoring the original packet.

More specifically, the packet transmitting and receiving circuitry 124 receives a burst access related access request from an adjacent initiator, which is connected to this NIC through a bus, at one cycle timing and transmits the access request to another bus which is implemented as a network at another cycle timing. The timing of sending out the access request is controlled by the transmission interval controller 125.

The transmission interval controller 125 receives information about the density of burst accesses during a period in which the burst accesses continue and information about the access load on the bus through which the packet transmitting and receiving circuitry 124 sends out the access request at respective predetermined cycle timings. Then, the transmission interval controller 125 determines the timing of transmitting the access request that has been received from the initiator by reference to those pieces of information and instructs the packet transmitting and receiving circuitry 124 to transmit the access request at a predetermined timing.

As to exactly how this transmission interval controller 125 works, it will be described in further detail later with reference to FIG. 13.

The packetizer 121, de-packetizer 122, packet buffer 123 and packet transmitting and receiving circuitry 124 are functions that an NIC generally has. Hereinafter, it will be described briefly how this NIC 120 carries out its processing using these components.

In transmitting a packet, the NIC 120 carries out its processing in the following manner. The packetizer 121 receives data from an initiator, and packetizes the data by adding a packet header to the data. The packet buffer 123 temporarily stores that packet. Then, the packet transmitting and receiving circuitry 124 retrieves the packet data from the packet buffer 123 on a transmission data bus width basis and transmits the packet.

On the other hand, in receiving a packet, the NIC 120 carries out its processing in the following manner. The packet transmitting and receiving circuitry 124 receives data on a reception data bus width basis and stores it on the packet buffer 123. In this manner, the packet is restored. Then, the de-packetizer 122 removes the packet header from the packet thus obtained, and outputs the remaining data to the initiator.

Next, the transmission interval controller 125 will be described.

The transmission interval controller 125 is an essential functional element for the NIC 120 of this embodiment.

Figure 13:
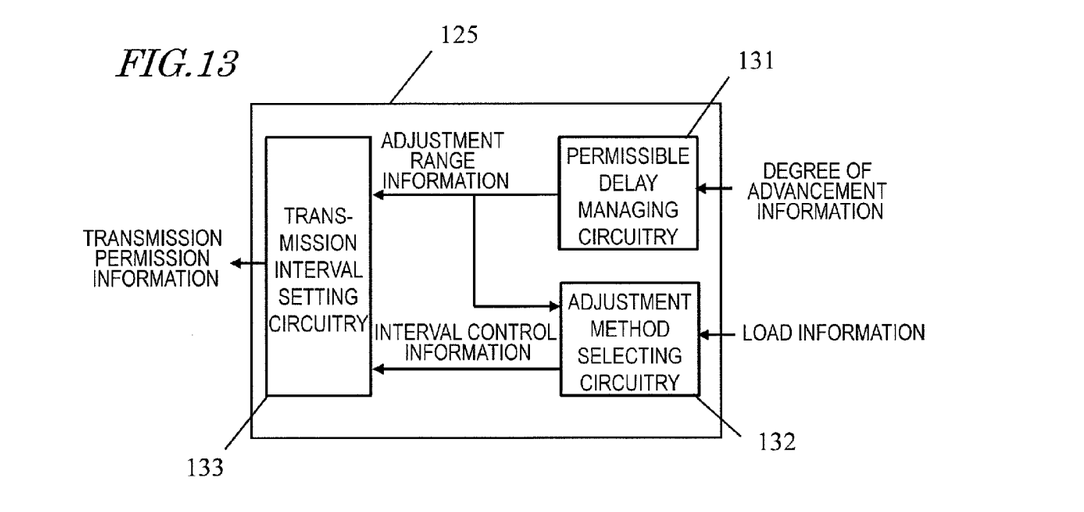
FIG. 13 illustrates a basic configuration for a transmission interval controller 125.

FIG. 13 illustrates a basic configuration for the transmission interval controller 125. As shown in FIG. 13, the transmission interval controller 125 includes permissible delay managing circuitry 131, adjustment method selecting circuitry 132 and transmission interval setting circuitry 133.

The permissible delay managing circuitry 131 determines a communication interval adjustment range, in which the processing can be carried out in virtually real time, by reference to information about the degree of advancement of the burst accesses (which will be referred to herein as "advancement information"). The advancement information is calculated and managed by the permissible delay managing circuitry 131.

The adjustment method selecting circuitry 132 selects a communication interval adjustment method by reference to load information and generates interval control information.

The transmission interval setting circuitry 133 sets a communication interval by reference to the adjustment range information and the interval control information and generates data transmission permission information.

Figure 14:
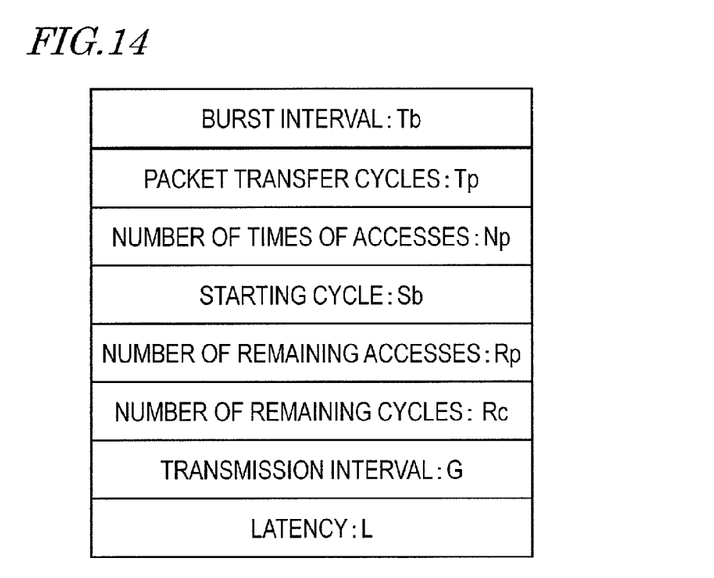
FIG. 14 shows an exemplary group of registers that store parameters to be managed by the 125.

FIG. 14 shows an exemplary group of registers that store parameters to be managed by the transmission interval controller 125. Hereinafter, it will be described what the parameters set for these registers mean.

Tb represents one period in which burst accesses are generated, and Tp represents the number of cycles it takes to transfer a transaction. For example, if a transaction with a size of 128 bytes needs to be transmitted through a 64 bit bus, the number of cycles becomes 16 cycles (=128/64*8).

Np represents the number of times of accesses generated within a single burst period. Sb is a register that stores the number of cycles at the start time of one burst period. Rp represents the number of remaining accesses which is obtained by subtracting the number of accesses already generated from the number of accesses Np to be generated within one burst period. Rc represents the number of remaining cycles available for getting the accesses done Rp times. G represents the transmission interval until the next access is started. And L represents the latest latency.

The parameters Tb, Tp and Np determine the properties of the memory access requested by the initiator. These parameters are initialized by the initiator on the respective registers before the memory starts to be accessed. On the other hand, the parameters Sb, Rp, Rc, G and L are used to record the internal parameters that are managed by the transmission interval controller 125. These parameters are reset into zero on the respective registers when the chip is either powered or reset. Meanwhile, Tc to be mentioned in the following description is the current value of a cycle counter and indicates the current time on the system. The cycle counter may be an n-bit counter which is reset into zero when the chip is either powered or reset and which is incremented every clock cycle.

Hereinafter, it will be described how the transmission interval controller 125 operates.

Figure 15:
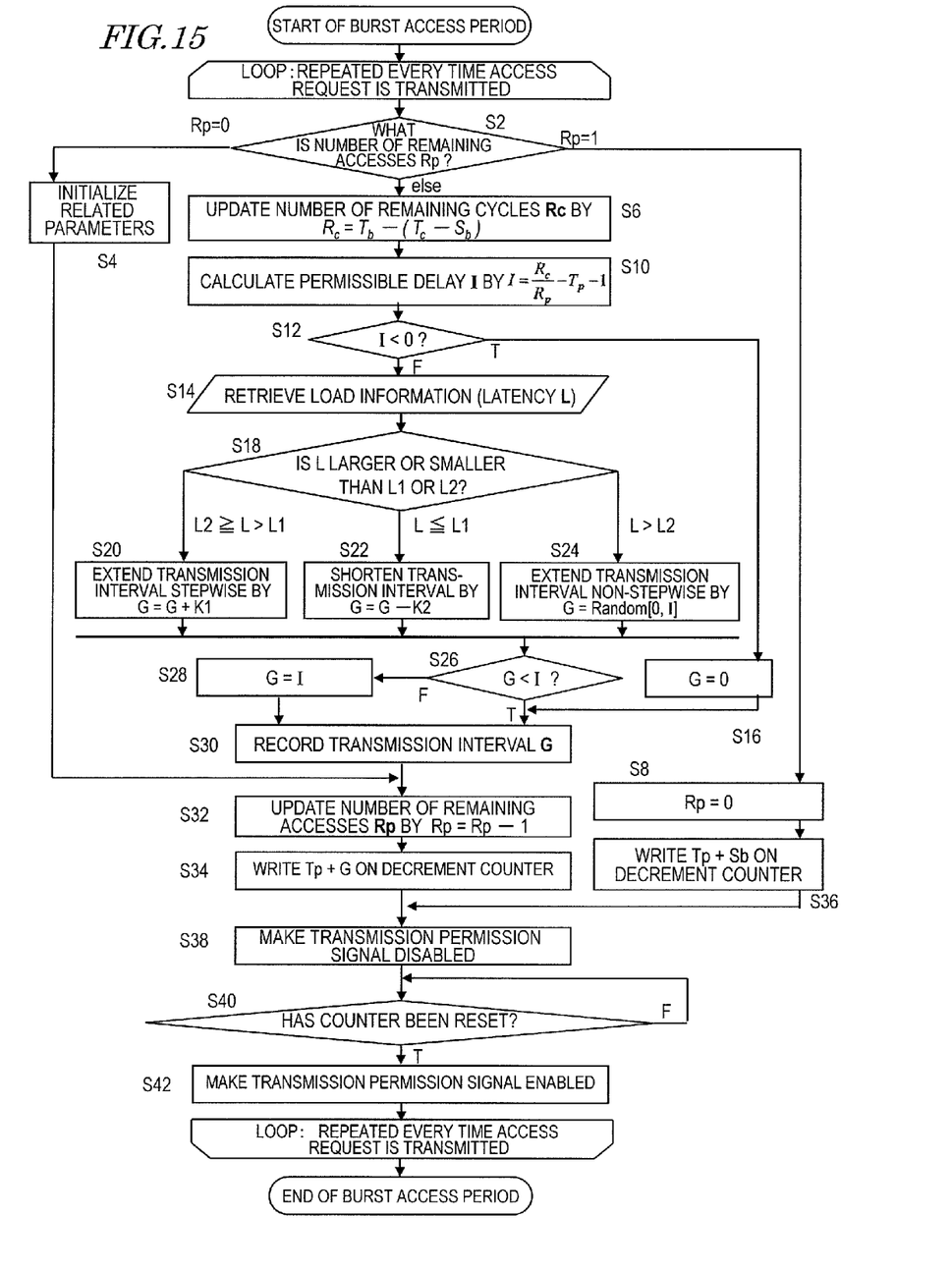
FIG. 15 is flowchart showing the procedure of the processing to be performed by the transmission interval controller 125.

FIG. 15 is a flowchart showing the procedure of the processing to be performed by the transmission interval controller 125. This is loop processing to be carried out repeatedly in response to every access request.

First of all, on sensing that an initiator has issued an access request with respect to a target and the NIC 120 has received a transaction, the transmission interval controller 125 starts its processing. For example, the transmission interval controller 125 monitors the packet buffer 123 (see FIG. 12). By detecting the presence of transaction data there, the transmission interval controller 125 senses that the access request and transaction have been received. Alternatively, the transmission interval controller 125 may also be notified by either the packet transmitting and receiving circuitry 124 or the packetizer 12 that the access request and transaction have been received.

In any case, on sensing that an access request has been received, the processing is started.

Next, in Step S2, the transmission interval controller 125 reads the number of remaining accesses register Rp. If it turns out that Rp=0, the process advances to Step S4. On the other hand, if it turns out that Rp=1, the process advances to Step S8. Otherwise, the process advances to Step S6. In this manner, the processing step to perform is changed according to the value of the number of remaining accesses register Rp in order to carry out the best processing according to the type of the burst accesses.

Figure 16:
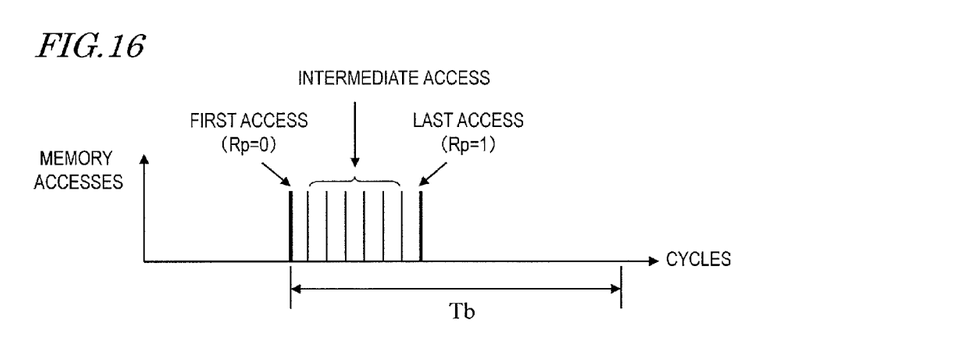
FIG. 16 shows the types of the burst accesses.

FIG. 16 shows the types of the burst accesses. As shown in FIG. 16, if Rp=0, it means that this is the first one of the accesses in one burst period. On the other hand, if Rp=1, it means that this is the last one of the accesses in one burst period. Otherwise, it means that this is an intermediate one of the accesses in one burst period. To make the transmission interval controller 125 operate properly, the contents of the processing to be carried out by respective sections are changed according to this embodiment depending on the situation.

Now take a look at FIG. 15 again. The processing step S4 is carried out if this is the first one of the burst accesses. The permissible delay managing circuitry 131 initializes the related parameters by the following Equations (1) to (4):

$$S_b = T_c \qquad (1)$$

$$R_p = N_p \qquad (2)$$

$$R_c = T_b' \qquad (3)$$

$$G = 0 \qquad (4)$$

In Equation (3), Tb' is a value obtained by subtracting the margin to be left as a time margin from one burst period Tb. The initiator needs a time margin for performing data processing after every access has been done within one burst period. A major factor that determines the margin to allow is the maximum number of cycles it takes to get that processing done.

When the processing step S4 is finished, the process advances to Step S32.

Next, the processing step S6 will be described. The processing step S6 is carried out if this is an intermediate one of the burst accesses.

In Step S6, the permissible delay managing circuitry 131 updates the number of remaining cycles Rc by the following Equation (5):

$$R_c = T_b - (T_c - S_b) \qquad (5)$$

Next, in Step S10, the permissible delay managing circuitry 131 calculates the permissible delay I by the following Equation (6):

$$I = \frac{R_c}{R_p} - T_p - 1 \qquad (6)$$

The permissible delay managing circuitry 131 provides the value of the permissible delay I as adjustment range information for the adjustment method selecting circuitry 132 and the transmission interval setting circuitry 133.

Subsequently, in Step S12, the adjustment method selecting circuitry 132 determines whether the value of the adjustment range information I is non-negative or negative. If the value is non-negative, the process advances to Step S14. On the other hand, if the value is negative, then the process advances to Step S16.

In Step S14, the permissible delay managing circuitry 131 gets load information in order to estimate the current status of the load on the network bus. As a piece of information to examine the load status, the value L of the latency involved with the latest transaction processing may be used. In this case, the latency is the amount of time it takes for a reply to a request issued to come back. Specifically, the value L of the latency may be obtained in the following manner. First of all, the packet transmitting and receiving circuitry 124 records, in a packet header, the value of the cycle counter Tc at a point in time when a request transaction is transmitted onto the network bus. Before sending out a reply transaction, the NIC on the target end records (i.e., copies) the cycle counter value recorded in the packet header of the packet received onto the packet header of the reply transaction packet that is going to be sent out. Alternatively, the permissible delay managing circuitry 131 may also obtain the latency by subtracting the cycle counter value at a point in time when the reply transaction packet arrives at the NIC on the initiator end from the copied cycle counter value (i.e., the cycle counter value at a point in time when the request transaction was transmitted).

In this example, a point in time when the NIC 120 on the initiator end sends out a request transaction onto the network bus is supposed to be the starting point and the amount of time that has passed since the starting point is supposed to be measured as latency. However, a point in time when the request transaction is received from the initiator may also be used as the starting point and the amount of time it takes for a response to the initiator's request to come back may also be measured as latency.

Furthermore, a plurality of initiators may be directly communicating with each other. In that case, a point in time when a request transaction is received from one initiator may also be set to be the starting point and the amount of time it takes for a response to that initiator's request to come back from another initiator may also be measured as latency.

Next, in Step S18, the adjustment method selecting circuitry 132 compares the latency value L calculated to preset threshold values L1 and L2 (where L1<L2), thereby selecting an adjustment method. If L>L2 is satisfied, it means that the load is heavy, i.e., there are too many packets being transmitted. In that case, the transmission interval should be extended to decrease the density of packets. On the other hand, if L≤L1 is satisfied, it means that the load is light, i.e., there are too small a number of packets being transmitted. In that case, the transmission interval could be shortened to increase the density of packets. And if L2>L≥L1 is satisfied, it can be said that the load is a medium one.

If L2>L≥L1 is satisfied, the process advances to Step S20, in which the transmission interval setting circuitry 133 makes adjustment so as to extend the transmission interval stepwise. The transmission interval G is calculated by G+K1.

K1 is the step adjustment width which is defined by the following Equation (7):

$$K_1 = k \cdot \frac{T_b}{N_p \cdot T_p} \quad (7)$$

According to this definition, the lower the ratio of the number of cycles in which data is transmitted by an initiator to the overall number of cycles that form one burst period, the wider the transmission interval adjustment width can be. In Equation (7), k is an adjustment parameter and a constant determined by simulation, for example.

Equation (7) will be described in further detail. (Np·Tp) included in Equation (7) is the product of the number of times of accesses Np generated within a single burst period and the number of cycles Tp it takes to transfer a single packet, and therefore, is the number of cycles required within a single burst period. That is why if one burst period Tb is divided by (Np·Tp), a time length per cycle within a burst access period can be obtained. The value thus obtained will be referred to herein as the "density of burst accesses". K1 included in Equation (7) is a value obtained by multiplying the density of burst accesses by the adjustment parameter k and is a value associated with the density of burst accesses.

If L≤L1 is satisfied, the process advances to Step S22, in which the transmission interval setting circuitry 133 makes adjustment so as to shorten the transmission interval stepwise. The transmission interval G is calculated by G−K2.

K2 is the step adjustment width. In this case, K2=1 may be satisfied or K2 may also be defined in the same way as K1 by substituting K2 for K1 in Equation (7).

And if L>L2 is satisfied, the process advances to Step S24, in which the adjustment method selecting circuitry 132 makes adjustment so as to extend the transmission interval non-stepwise.

In Step S24, the transmission interval setting circuitry 133 updates the transmission interval G by the following Equation (8):

$$G = \text{Random}[a, I] \quad (8)$$

It should be noted that in Step S24 shown in FIG. 15, "a" is supposed to be zero.

The non-stepwise adjustment is not an indispensable one. However, if the non-stepwise adjustment is made, the controller could quickly get out of an overload state in which the latency cannot be eliminated even by making the stepwise adjustment. In Equation (8), "a" indicates the lower limit of an interval in which random numbers are generated. Either a=I/2 or a=K1 may be satisfied. Also, the probability distribution of the random numbers may be a uniform distribution.

The adjustment method selecting circuitry 132 provides the adjustment method selected as interval control information for the transmission interval setting circuitry 133. After that, the process advances to Steps S26 and S28.

In Step S26, the transmission interval setting circuitry 133 compares the transmission interval G to the permissible delay I. If the transmission interval G is found to be shorter than the permissible delay I, the process advances to Step S30, in which the transmission interval setting circuitry 133 records the transmission interval G. On the other hand, if the transmission interval G is found to be equal to or longer than the permissible delay I, the process advances to Step S28, in which the transmission interval setting circuitry 133 sets the permissible delay I to be the transmission interval G. Then, in Step S30, the transmission interval setting circuitry 133 records that transmission interval G.

In this example, two threshold values L1 and L2 are supposed to be set. However, this is only an example of the present disclosure. Alternatively, only L1 may be used as the threshold value. In that case, if L>L1 is satisfied, an adjustment to extend the transmission interval stepwise may be carried out. On the other hand, if L≤L1 is satisfied, then an adjustment to shorten the transmission interval stepwise may be carried out.

In this case, the transmission interval G may be set by performing the following processing.

First, if the transmission interval needs to be extended stepwise (in a situation where L>L1), the transmission interval setting circuitry 133 updates the transmission interval G by the following Equation (9):

$$G = \min\{G + K_1, I\} \quad (9)$$

K1 is just as defined by Equation (7).

On the other hand, if the transmission interval needs to be shortened stepwise (in a situation where L≤L1), the transmission interval setting circuitry 133 updates the transmission interval G by the following Equation (10):

$$G = \min\{\max\{G - K_2, 0\}, I\} \quad (10)$$

In this case, either K2=1 may be satisfied or K2 may be defined as in Equation (7).

It should be noted that min in Equations (9) and (10) includes the processing steps S26 and S28 shown in FIG. 15.

The transmission interval setting circuitry 133 includes an internal decrement counter. Only if the value of the decrement counter is zero, the transmission interval setting circuitry 133 asserts a transmission permission signal and enables the initiator to issue a request transaction. Meanwhile, if a non-zero value is written on the decrement counter, the transmission interval setting circuitry 133 negates the transmission permission signal and instructs the initiator to refrain from making a memory access until the initiator gets ready to issue a new request transaction. The value of the decrement counter is decremented every time the cycle counter is incremented, and gradually comes closer to zero.

In Step S32 to be performed if this is the first one of the burst accesses, the transmission interval setting circuitry 133 decrements the number of remaining accesses Rp (i.e., Rp=Rp−1). Next, in Step S34, the transmission interval setting circuitry 133 writes Tp+G on the decrement counter. Then, in Step S38, the transmission interval setting circuitry 133 makes the transmission permission signal "disabled". As a result, the initiator is prohibited from issuing any request transaction within Tp+G cycles.

In Step S16 to be performed if this is an intermediate one of the burst accesses, on sensing, by reference to the adjustment range information, that the permissible delay I has a negative value, the transmission interval setting circuitry 133 updates the adjustment range information G into zero to get the processing done by the initiator in as close to real time as possible. After that, the process advances to Step S30, in which the value of the transmission interval G is recorded. Subsequently, the transmission interval setting circuitry 133 decrements the number of remaining accesses Rp (i.e., Rp=Rp−1) in Step S32, writes Tp+G on the decrement counter in Step S34, and then makes the transmission permission signal "disabled" in Step S38. As a result, the initiator is prohibited from issuing any request transaction within Tp+G cycles.

In Step S8 to be performed if this is the last one of the burst accesses, the transmission interval setting circuitry 133 resets the number of remaining accesses Rp into zero. After that, the transmission interval setting circuitry 133 writes Sb+Tb on the decrement counter in Step S36, and then makes the transmission permission signal "disabled" in Step S38. As a result, the initiator is prohibited from issuing any request transaction within Tp+Sb cycles.

Thereafter, on sensing in Step S40 that the counter has been reset, the transmission interval setting circuitry 133 makes the transmission permission signal "enabled" in Step S42. As a result, the initiator is permitted to issue a request transaction now.

By not just extending but also shortening the transmission interval, the accesses can get done Np times earlier than previously, and accesses from other initiators that should be generated afterwards can be accommodated within the bus band as many as possible. For example, the CPU shown in FIG. 4 is used for interacting with the user, browsing the Internet, and for other purposes, and therefore, it is difficult for the CPU to predict the number of times of memory accesses to be generated to get the user instructed processing done. Even in such a situation, if each initiator can get every memory access done early enough by shortening the transmission interval, the accesses to be made by the CPU that has been started by the user can still be accommodated within the bus band. Consequently, the bus band can be used much more efficiently.

Figure 17:
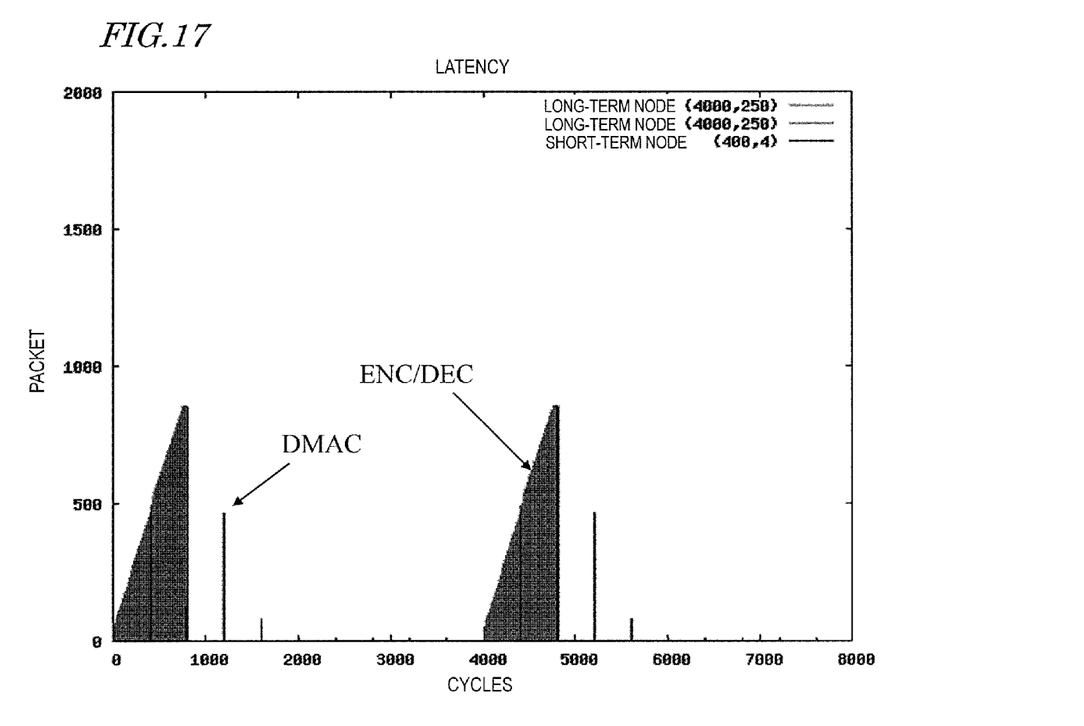
FIG. 17 shows modeled accesses by ENC, DEC and DAMC and the magnitudes of latencies that were compared to each other and estimated by using a software simulator.
Figure 18:
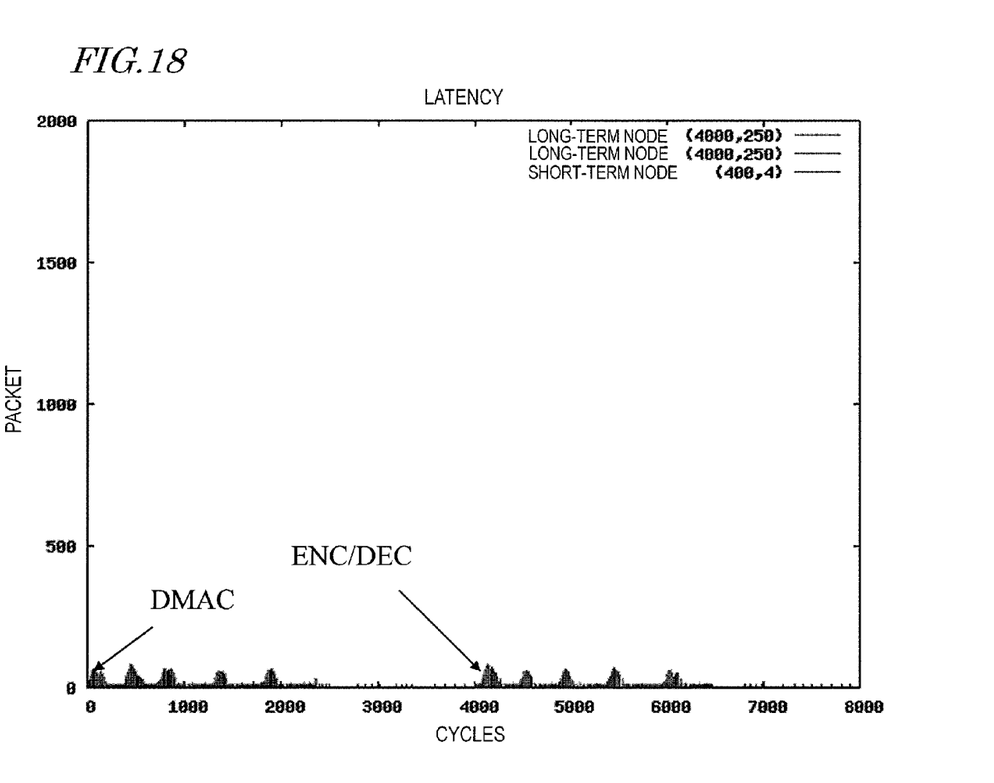
FIG. 18 shows modeled accesses by ENC, DEC and DAMC and the magnitudes of latencies that were compared to each other and estimated by using a software simulator.

By making the transmission interval controller 125 operate as described above, the processing can get done in virtually real time on a network bus that shares the same link in common between multiple initiators, and the bus band can also be used more efficiently as well. FIGS. 17 and 18 show modeled accesses by ENC, DEC and DAMC and the magnitudes of latencies that were compared to each other and estimated by using a software simulator. In FIGS. 17 and 18, the abscissa represents the time (the value of a cycle clock) and the ordinate represents the latency value (in cycles). Conditions for the access models of the three kinds of initiators used were set as follows:

ENC: Tb=4000, Np=250 and Tp=4 (grey)
DEC: Tb=4000, Np=250 and Tp=4 (grey)
DMAC: Tb=400, Np=4, and Tp=4 (black)

FIG. 17 shows the latencies involved with packets that were not subjected to the transmission interval control. As can be seen from FIG. 17, after burst accesses were started by ENC and DEC at Cycle #0, the latencies continued to increase at a constant rate until around Cycle #850. As for memory accesses to DMAC that were carried out when the bus was overloaded with the burst accesses, the latencies also increased owing to the burst accesses.

On the other hand, FIG. 18 shows the latencies involved with packets that were subjected to the transmission interval control of this embodiment. As can be seen from FIG. 18, after burst accesses were started by ENC and DEC at Cycle #0, the transmission interval was controlled as the latency increased. As a result, the latency could be decreased to approximately 50 cycles. It can also be seen that the accesses to DMAC could also get done with short latencies since vacant cycles had been generated by controlling the transmission interval. In addition, it can also be seen that since a control for shortening the transmission interval was carried out, the accesses that should have been done 4000 times by each of the ENC and DEC from Cycle #0 through Cycle #4000 could actually get done by Cycle #2000. As can be seen, the results of simulations reveal that the processing could get done by each initiator in virtually real time and that the bus band could be used much more efficiently.

In the embodiment described above, the transmission interval controller is supposed to form part of an NIC on the initiator end. However, the transmission interval controller may also be provided outside of the NIC functional block. Furthermore, the topology of the network bus that connects initiators and targets together is supposed to be a fly network in the foregoing description, but may also be any other topology such as a mesh network or a torus network.

A controller according to an aspect of the present invention is applicable to a packet exchange type communications bus on a semiconductor LSI that performs real time processing on any of various kinds of integral devices including audiovisual consumer electronic appliances such as TV sets and recorders and mobile electronic devices such as cellphones. Also, a control method and control program according to another aspect of the present invention can be used to make a plurality of initiators which share the same bus in common communicate with each other efficiently by controlling the transmission interval of packets.

What is claimed is:

1. A controller which controls a timing of transmitting an access request that has been received from an initiator, the controller comprising:

transmitting and receiving circuitry configured to receive an access request related to burst accesses from a first initiator that is connected via a first bus to, and adjacent to, the transmitting and receiving circuitry and configured to transmit the access request to a second bus implemented as a network; and a transmission interval controller configured to control the timing of transmitting the access request that has been received from the first initiator according to density of the burst accesses during a period in which the burst accesses continue and an access load on the second bus, said density of the burst accesses determined from the equation $$\frac{T_b}{N_p * T_p},$$

where $T_b$ is one burst period in which the burst accesses are generated, $N_p$ is the number of times of accesses generated within a single burst period, and $T_p$ is number of cyles to transfer a single packet.

2. The controller of claim 1, wherein the transmission interval controller calculates the density of the burst accesses based on how many times the access requests have been received from the first initiator during the period in which the burst accesses continue.

3. The controller of claim 2, wherein either a second initiator or a target is connected to the second bus, and
wherein the transmission interval controller obtains, as the access load on the second bus, a latency that is the amount of time that it takes for a response to the access request that has been transmitted to either the second initiator or the target to come back.

4. The controller of claim 3, wherein if the value of a permissible delay, which is the maximum amount of delay permitted by an access request from the first initiator, is not negative, the transmission interval controller obtains the latency and controls the timing of transmitting the access request that has been received from the first initiator.

5. The controller of claim 4, wherein the transmission interval controller calculates the value of the permissible delay based on a predetermined cycle, the number of remaining cycles, and the number of unprocessed access requests.

6. The controller of claim 4, wherein the transmission interval controller calculates the latency between the first initiator and the second initiator or target that is connected to the second bus, and if the latency is greater than at least one predetermined threshold value, extends the transmission interval so as to delay the timing of transmitting the access request that has been received from the first initiator.

7. The controller of claim 5, wherein the transmission interval controller calculates a second transmission interval by adding a value associated with the density of the burst accesses to a first transmission interval currently set, and if the second transmission interval is smaller than the value of the permissible delay, controls the timing of transmitting the access request that has been received from the first initiator based on the second transmission interval.

8. The controller of claim 4, wherein the transmission interval controller calculates the latency between the first initiator and the second initiator or target that is connected to the second bus, and if the latency is equal to or smaller than at least one predetermined threshold value, shortens the transmission interval so as to accelerate the timing of transmitting the access request that has been received from the first initiator.

9. The controller of claim 5, wherein the transmission interval controller calculates a second transmission interval by subtracting a value associated with the density of the burst accesses from a first transmission interval currently set, and if the second transmission interval is smaller than the value of the permissible delay, controls the timing of transmitting the access request that has been received from the first initiator based on the second transmission interval.

10. The controller of claim 7, wherein if the second transmission interval is equal to or greater than the value of the permissible delay, the transmission interval controller controls the timing of transmitting the access request that has been received from the first initiator based on the value of the permissible delay.

11. The controller of claim 9, wherein if the second transmission interval is equal to or greater than the value of the permissible delay, the transmission interval controller controls the timing of transmitting the access request that has been received from the first initiator based on the value of the permissible delay.

12. The controller of claim 10, wherein the transmission interval controller prohibits the first initiator from issuing access requests for a period of time corresponding to the sum of the second transmission interval and the time it takes to transfer a transaction.

13. The controller of claim 11, wherein the transmission interval controller prohibits the first initiator from issuing access requests for a period of time corresponding to the sum of the second transmission interval and the time it takes to transfer a transaction.

* * * * *